April 25, 1939.   E. W. THOMPSON   2,155,849
DOOR OPERATING MECHANISM
Filed Jan. 29, 1934    2 Sheets-Sheet 2
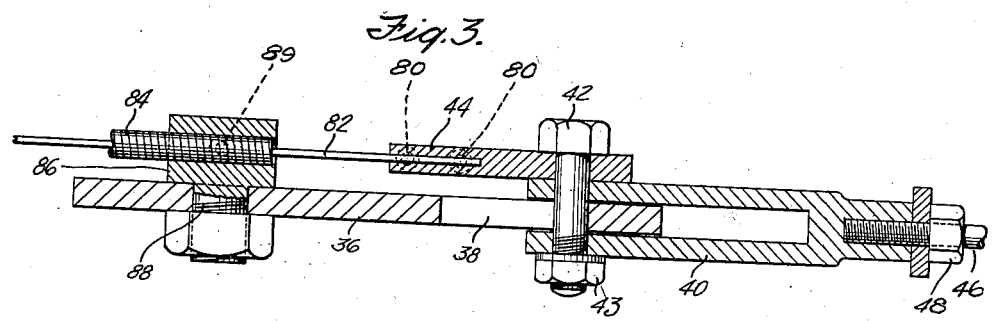
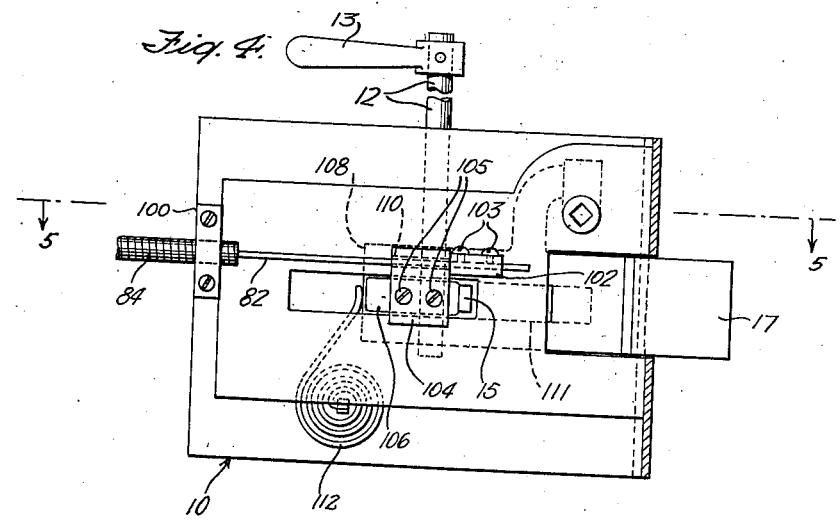
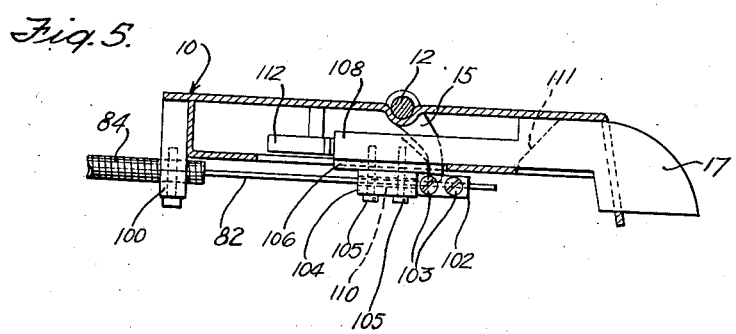
INVENTOR
ELLERY W. THOMPSON
BY Newell & Spence
& Safford
ATTORNEYS Patented Apr. 25, 1939

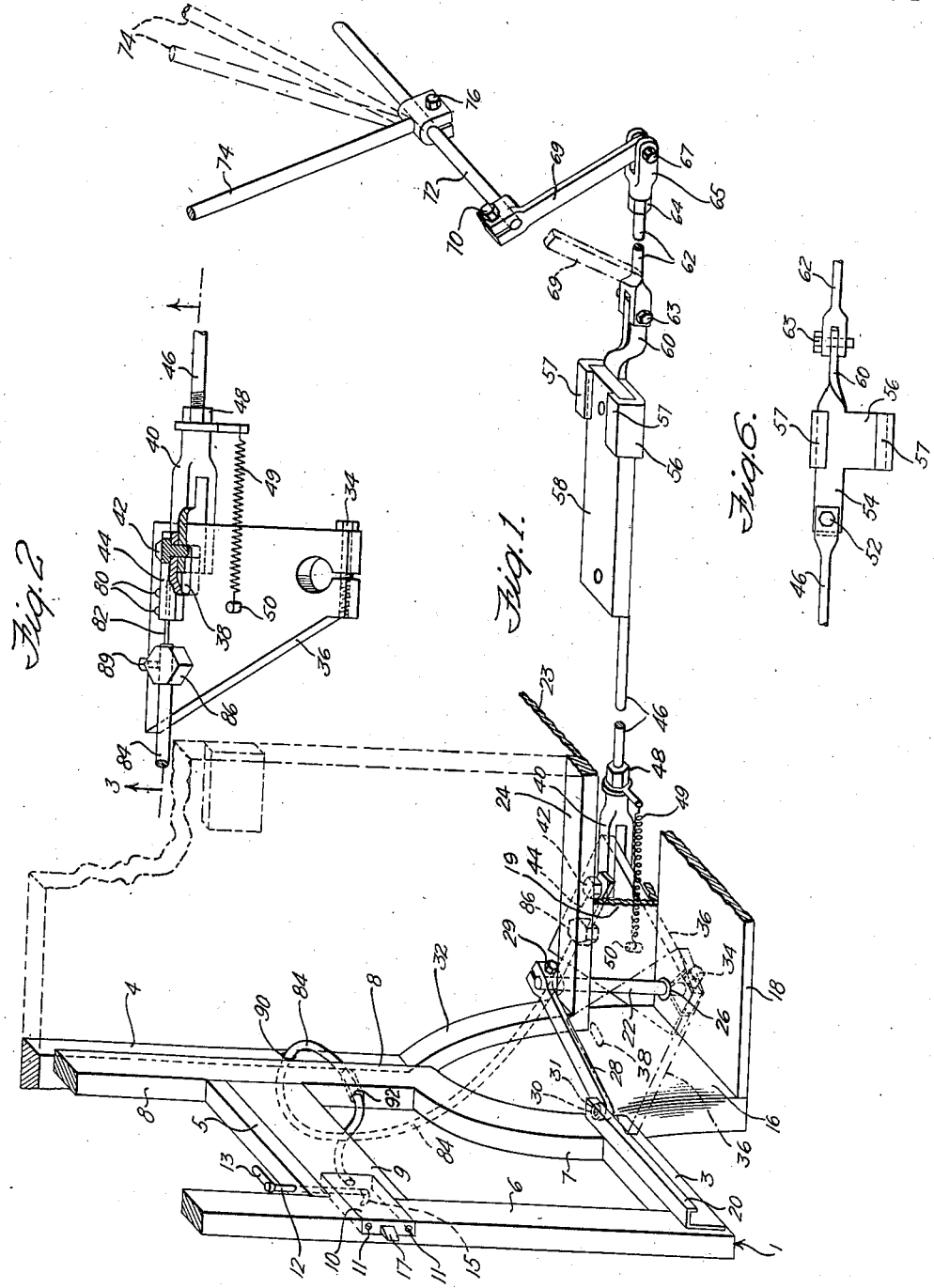

2,155,849

UNITED STATES PATENT OFFICE 2,155,849

DOOR OPERATING MECHANISM

Ellery W. Thompson, New York, N. Y.

Application January 29, 1934, Serial No. 708,769

9 Claims. (Cl. 268—3)

This invention relates to mechanism for producing a primary motion of mechanically interrelated parts and a differential motion between some of the parts moved in the primary motion. The invention relates especially to mechanisms for opening and closing doors of vehicles and has particular reference to the operation of a latched door remote from the driver or operator of a public conveyance.

Many devices have been proposed for operating doors of buses and taxicabs and other vehicles by means accessible to the hand of the driver of the vehicle. Such devices should provide not only for opening and closing the doors by the operation, at the will of the driver, of mechanical or other mechanisms but also should insure the unlatching of the door prior to the actual motion of opening as well as the latching of the door after closure. It is also desirable, especially in the case of taxicabs and of some other vehicles, that the door may be opened from the inside or from the outside of the vehicle regardless of the position of the mechanism operable by the driver. In such cases the arrangement of the device must be such that the mechanism shall interfere neither with the normal opening and closing movement of the door nor with the operation of its latching device. It is also necessary that the normal operation of the door shall be consistent with that of the control mechanism operable from the driver's seat. Usually the normal opening of the door must cause the attached mechanism for the opening of the door from the driver's seat to move as if operated by the driver.

It is an object of the present invention to secure the features above described while at the same time overcoming the difficulties and disadvantages which have been experienced in the devices of the prior art. Heretofore one difficulty has been to provide a simple connection between the parts of the mechanism which are adapted to be attached to the body or to the chassis or to other main supporting structure of the vehicle and the parts of the mechanism which are supported by the door and are connected to the latch. Because in the motion of the door upon its hinges all parts of the door move in arcs of circles around the axis of the hinges, devices attached to the door even though of small size, must be connected to the parts attached to the chassis or to the frame of the vehicle and these devices and portions of the connected parts must move in these circles toward the chassis or the frame or away from the chassis or frame in the operation of opening and closing the door.

In order to take up or provide for this approach or separation of the parts upon the chassis and upon the door, links or levers or other mechanical connections heretofore have been utilized. Such connections usually are complicated and may involve special designs for different kinds of doors and for different types of vehicles. Moreover they protrude into the angular space between the door and the side of the vehicle and usually it has been necessary to so position such devices, in order to secure their operation, that they obstruct the door opening itself. Thus these connecting links or levers or similar mechanisms interfere with the easy and clear access to and exit from the vehicle. In some cases such devices constitute a hazard because of the liability of their damaging garments or causing injury by tripping the person entering or alighting from the vehicle.

In order to overcome the above-mentioned disadvantages and difficulties as well as others which are experienced in the utilization of mechanical devices for the purpose to which the invention is directed, the present invention removes from the angular space between the door and the side of the vehicle all such mechanisms which protrude into this angular space and inside which angular space these parts as heretofore arranged must be articulated and must move when the device is operated. In a broad sense, the invention provides for the operation of the door by mechanical or other suitable means capable of transmitting a motion of the door, initiated by the driver or at a remote point, to open or close the same. Many different forms of mechanisms or other means of accomplishing the main movement of the door may be utilized and in the description to follow, and in the drawings, I have disclosed one form of device which I have utilized.

In combination with such a device for securing the opening and closing movements of the door, according to my invention I propose to utilize a connection, between the latch and the mechanisms for producing the door movement, which does not protrude into the angular space between the frame of the car and the door and which does not obstruct the door opening. Moreover, the means provided by my invention for transmitting motion to the latch is so flexible and is so constructed and arranged that it may be mounted within the door as well as behind the door frame in the body and underneath the seats or in other relation to parts of the vehicle so as to be not only out of sight but out of the way of the passenger and so as to be entirely protected from damage while being capable at all times of the motion necessary to operate the latch. The operation of the device is thus insured and the life of the mechanism increased.

To secure these relationships and the advantages attendant thereon according to my invention, I have found it practicable to utilize a wire or similar member of such material and of such size with respect to the length necessary to connect, directly or through other members, between the latch of the door and the mechanism for opening and closing the door that I may produce the desired pull upon or other force causing motion of the latch to release it from engagement with the striking plate, that is with that portion of the lock which is fixed in the door frame, while at the same time providing for a flexible relationship between the wire and the door as well as between the wire and the frame of the door or the structure of the vehicle.

I have so selected the wire or other connecting member as to its material, size and length and as to the arrangement thereof with respect to the door and to the frame of the vehicle that the motion transmitted thereto at one end thereof may cause the latch to be released from engagement with the striking plate in the door frame and after such release may cause the latch to return to its latching position in the lock frame upon the door. I may provide this action without interfering with the flexibility of the wire itself with respect both to the door and the door jamb as will be hereafter described more in detail in connection with the drawings. I may transmit to this wire the motion for opening and closing the latch, as described above, by a differential arrangement of said connection and of the parts of the mechanism which are used for opening and closing the door. The mechanism may be arranged with such relationship of the parts that during the action of release of the latch the force transmitted by the mechanism is not applied to the opening of the door. However, immediately upon completing release of the latch, the force transmitted through the mechanism is exerted to open the door and thereafter the opening or closing movement of the door is effected.

In order to produce this action upon the latch, in the embodiment hereafter to be described, I utilize the first portion of the motion of the door opening device itself to effect a pull upon the wire in order to release the latch from engagement with the striking plate in the door frame. I may, however, within the scope of my invention use some other portions of the motion of the door opening mechanism and transmit the said motion to the latch. Moreover, within the scope of my invention, I may arrange for independent operation of the latch. This I may do by carrying the wire from the door to a position convenient for the driver and operable, for example, adjacent the handle for operating the door opening and closing mechanism. While, preferably, I arrange the parts which are embodied in my invention so that, as referred to above, the operation of the latch is automatically effected upon a motion of the door opening mechanism being produced at the will of the driver, nevertheless, the independent operation of the latch as well as the operation of the latch by flexible mechanical or other flexible connection to the door opening mechanism both embody an important feature of my invention.

This feature provides for the operation of the latch in any position of the door, and, according to my invention, I provide means for the proper support of the wire and for maintaining its proper alignment and relation to the parts which it connects so that, regardless of the position of the door, the wire may be pulled or otherwise moved in order to cause the latch to be opened and upon release of the pull, the wire and the latch may return to their initial positions ready for further operation. Moreover, I provide for this support and alignment of the wire, while maintaining the flexibility of the wire and the flexible connection between the door opening mechanism and the latch.

In the embodiment hereafter to be described in connection with the drawings I have shown as such a means for supporting and maintaining alignment of the wire a flexible casing completely surrounding the wire and substantially coextensive with its length. This casing when properly mounted is capable of taking up and compensating for the angular motion of the door upon its hinges when a portion of the casing extends across the angular space between the hinge edge of the door and the door frame without interfering with the flexibility of the wire which it supports. However, the casing so fits the wire that it provides a bearing surface upon which the wire may slide lengthwise of the casing and when the casing and the wire are bent, as for example to a bend across the angular space between the door and the side of the door opening, the wire still may be pulled through the casing. Moreover, in the different positions which the casing must take in order to take up and compensate for the motion of the door between its opened and closed positions, it is capable of thus supporting the wire so that the wire may be moved through the casing when the door is in any possible position. It is a feature of my invention that this casing and the wire supported thereby, being flexible and providing for the different positions of the door, at the same time are of such form and of such size and arrangement with respect to each other that the casing affords a sufficiently stiff structure when in any selected position so that it properly supports the wire and so that the wire may be moved therethrough with comparative ease.

Also within the scope of my invention, I may transmit the selected motion of the door opening mechanism itself as a push or as a torsional motion or other type of motion instead of as a pull upon the wire while at the same time maintaining the flexible feature of said wire. Thus, for example, within the scope of my invention I may utilize instead of a wire capable of transmitting a pull as referred to above and hereafter described as the present preferred embodiment of the invention, a wire of such stiffness as to transmit a push applied at one end thereof or I may use a cable or a chain of suitable design to transmit these forces. Moreover I may utilize members of this type which are capable of transmitting torsional motion. In connection with such other forms of members, I may utilize a casing similar to that described above for the support and alignment of the wire, cable or other member while maintaining the flexibility of the connection which it provides. Thus the casing constitutes a means which confines the wire or the cable, or similar member, which means is of such form that it may be suitably fastened to the door and to the other parts of the vehicle without interfering with and in fact supporting the flexibility of the wire or cable or similar member and insuring the latch releasing motion thereof which is a feature of my invention.

In the particular embodiment of my invention hereafter to be described I have utilized a flexible casing formed by a helically wound wire. The coils of the helix are closely wound and the casing thus forms substantially a continuous flexible tubular member, the inner diameter of which is in close but loosely fitted relation to the diameter of the wire passing therethrough. The wire thus may be pulled through the flexible tube thus formed and the casing may be bent into a curve or a series of curves in its length. The wire forming the helical coils is of such material and of such size as to secure substantial flexibility while also providing sufficient stiffness of the wall of the tube as to secure support for the transmission wire and provide a bearing surface upon which it may slide and also to provide the important feature of the invention referred to above, namely, that this casing, regardless of the flexed position or form which it must take as a result of the different positions of the door, permits and insures that the wire may slide therethrough. While in the particular embodiment hereinafter described in connection with the drawings I have shown a casing surrounding a wire, which casing is coextensive with the wire, I may utilize other forms of the means for confining the wire or cable and insuring the requisite flexibility without interfering with the motion of the latch moving wire or similar member.

The invention will be more fully understood from the following description taken in connection with the drawings in which:

Figure I shows in perspective an assembly of the operating mechanism of my invention in connection with the door of an automobile.

Figure II shows the parts of the operating mechanism which provide for the differential motion for moving the latch.

Figure III shows a cross-section on line 3—3 of Figure II.

Figure IV shows an elevation of a door lock with the device of my invention connected thereto.

Figure V shows a section on line 5—5 of Figure IV.

Figure VI shows a plan-view of a portion of the mechanism shown in Figure I.

In Fig. I the door of an automobile is shown in an open position. This door is constructed with a usual frame having a lower member 3 and a cross member 5 adjacent the middle of the height of the door. Connecting said members 3 and 5 and forming one vertical member of the door is the post 6. At the hinge side of the door is a vertical post 8. Between the post 8 and the lower member 3 is a curved member 7 conforming to the curve of the door jamb 32 parallel to that of the mud guard 16 as is usual in many automobile doors. Connecting between the vertical post 6 and the vertical post 8 is a plate 9 of such thickness as to provide space between said plate and the outer covering of the door. The plate 9, in connection with post 6, forms the support for the lock 10 of the door which is fastened thereto by suitable fastening means 11.

Extending vertically through the cross member 5 is a spindle 12 to which is attached handle 13 by means of which, through spindle 12 and the dog 15, normal operation of the latch 17 of the lock 10 is accomplished.

Attached to the lower member 3 of the door structure is an inverted channel member 20 fastened to the member 3 by suitable fastening means and in a generally horizontally extending position. Mounted in a vertical position and passing through the running board 18 is a shaft 22 extending close to the chassis frame 19 and up through the floor 23 of the automobile inside the sill 24 of the door opening. This shaft may be mounted in suitable bearings one of which is indicated in Figure I at 26 inserted in the running board 18. At the upper end of said shaft 22 is fastened a lever arm 28 by suitable clamping means 29. Said lever arm 28 extends in a horizontal position and swings about the axis of the shaft 22 in a horizontal plane in the motion of opening and closing the door. At the outer end of the lever arm 28 is fastened a bolt 30 carrying a roller 31 (concealed by the channel in the figure) which roller is of such size as to move in the channel of the inverted channel member 20 and to bear against the inside surfaces of the flanges thereof. The shaft 22 is preferably positioned with its axis in as close parallel alignment with the axis of the hinges of the door as the structure of the vehicle will permit. In the particular embodiment shown the shaft 22 is positioned close to the rearward end of the sill 24 while permitting the lever arm 28 to swing outwardly over the sill 24 and, without interfering with the curved portion 32 of the door opening.

From Figure I it will be apparent that when motion of rotation is given to the shaft 22, the lever arm 28 being fixed thereto, force will be applied at the outer end of the lever arm 28 to the inverted channel member 20 to cause the door to swing upon its hinges. By motion of the lever arm 28 toward the right in Figure I the door will be moved toward the closed position. It will also be apparent as the shaft extends up through the floor 23 at the inside of the vehicle that the door may be completely closed without interference of the lever arm 28. In such motion the roller 31 carried by the bolt 30 moves along the channel 20 toward the end thereof adjacent the post 6 of the door. It will also be noted that the mechanism connected to the door for effecting this movement from the open to the closed position and the reverse occupies no appreciable part of the angular space between the door and the door opening in the frame of the vehicle. In the open position of the door, as may be seen in Figure I, the lever arm 28 and the upper end of the shaft 22 are not in such a position as to interfere with exit from the vehicle and there is no danger of the passenger tripping over this mechanism when alighting or entering the vehicle.

Upon the lower end of the shaft 22 is fastened by a clamping bolt 34 a plate 36 having the function of a lever or a crank disc to which the mechanism leading from the operating handle adjacent the driver's seat is connected. This plate 36, however, has an additional function hereafter to be described. Connected to said plate 36 is a clevis 40 between the legs of which the plate 36 may be inserted. Passing through the extremities of the legs of the clevis 40 is a bolt 42 which may be loosely fitted to said legs to permit angular motion of the clevis 40 around said bolt. This bolt, in the particular embodiment illustrated, also holds above the upper leg of the clevis 40 a block 44, the function of which is to be hereafter described. This block may be fixedly fastened to said bolt or may be free to turn upon said bolt. The bolt 42 passes through a slot 38 in the plate 36 and is free to slide along said slot from one end to the other but is held by nut 43 from slipping out of place. The position of this slot and the length thereof in the plate 36 are such, in consideration of the angular motion of said plate, as to permit motion of the bolt 42 in general or average alignment with the clevis and in general alignment with a rod 46 to which by suitable fastening means 48 the clevis is attached. Also attached to the rod or to the clevis by suitable means is a spring 49 having the opposite end thereof fastened to the plate 36 by a screw or fastening means 50.

The opposite end of the rod 46 is suitably formed for attachment by means of a bolt 52, providing a somewhat loosely fitting joint, to a lug 54 of a cross-head member 56. The cross-head member 56 is formed with flanges 57 and 57 bearing upon a slide 58 fastened upon the chassis frame or other suitable support upon the vehicle. To a lug 60 on the opposite side of the cross-head member 56 is connected the rod 62 by a suitable bolt 63 providing a relatively loosely fitting joint.

The cross-head member 56 in the particular embodiment shown has been provided in order to compensate for the motions of the parts of the mechanism produced by the movement of levers of relatively short length about their axes, some of these levers moving in horizontal planes and others in vertical planes. Other means such as universal joints and other devices for compensating for kinematically inconsistent or difficult motions may be used. The device illustrated shows merely one form of effecting such compensation and in some cases such a device may be unnecessary. The rods 46 and 62 then may be a common rod or other connection. Moreover within the scope of my invention other devices for transmitting motion may be used such as an endless cable connecting over pulleys and attached to the plate 36 so as to cause it to move in the horizontal plane about the axis of the shaft 22 through the angle corresponding to that of the lever arm 28 required to move the door from the closed to the open position or vice versa.

In the particular embodiment shown however the rod 62 connects the cross-head member 56 through a suitable fastening means 64 to a clevis 65 attached by a suitable bolt 67 providing a relatively loose fit, to the lower end of the downwardly extending lever 69. This lever 69 is clamped at its upper end by a fastening means 70 upon a horizontal shaft 72 extending transversely of the vehicle. This shaft may be mounted in suitable bearings (not shown) to hold it in position relative to the frame of the vehicle. Upon the central portion thereof or at any other point in its length may be mounted the handle or lever 74 which should be convenient to the driver's seat. This lever 74 may be clamped upon the shaft 72 by a suitable fastening means 76.

It will now be apparent that motion applied to the handle 74 will be transmitted through the shaft 72 to the lever 69 and also to the rod 62, and from this rod 62 to the cross-head member 56. The cross-head member 56 will transmit motion to the rod 46, and the bolt 42 through the clevis 49 will move in the slot 38 or will bear upon the end of the slot 38 to cause rotating motion to the plate 36, depending upon which direction motion is applied to the lever 74. The levers 74 and 69 in the dotted outline position shown in Figure I are in their respective positions when the door is about to be operated from the closed to the open position and conversely motion of these parts from the full line positions to the dotted positions effects the closing of the door. The spring 49 is a tension spring connecting both to the rod 46 and to the plate 36 and is of such strength as to tend to keep the bolt 42 at the left-hand end of the slot 38. This spring 49 however is not so strong in view of friction of the mechanisms attached to the door, especially when closed, but that the initial motion given to the lever 74 by the driver, that is toward the left in Figure I and causing motion of the clevis 65 toward the right, will under the pull of the rod 46 move the bolt 42 from the left-hand end of the slot 38 to the right-hand end thereof and thereupon cause the bolt 42 to bear upon the right-hand end of the slot 38 and thus to pull upon the plate 36. The relation of the parts thus attained is shown in Figure II. The motion of the lever 74 necessary to produce translation of the bolt 42 lengthwise of the slot 38 is indicated in Figure I by the angular displacement of the lever 74 in dash lines from the lever 74 in dotted lines.

While the mechanisms shown in full lines in Figure I in the positions which they take when the door is fully opened, it will be apparent from a study of the figure that when the levers 74 and 69 are in the dotted position, the plate 36 will be in the dotted position displaced from that shown in full lines in Figure I toward the left, and the lever arm 28 and the door 1 will be angularly displaced toward the right. The motion necessary to produce the closing of the door will be that of a push of the bolt 42 upon the left-hand end of the slot 38, this push being transmitted through the levers and mechanisms. When, now, the door being closed and the plate 36 being in the corresponding dotted position displaced to the left, the lever 74 is moved from the dotted position to the dash position, the first motion which takes place is that of the bolt 42 toward the right in the slot 38 until it bears on the right-hand end of the slot 38. This action takes place as referred to above against the spring 49 but the plate 36 is not thereby moved and the opening motion of the door is not yet started. However, when the bolt 42 reaches the right-hand end of the slot 38 the opening motion of the door is started and may be completed by further movement of the lever 74 into the full line position.

It will be recognized that in the motions just described there is a differential motion of parts of the machanism for opening the door. This differential motion is utilized as will be hereafter described to effect the release of the latch. It will be understood that this releasing of the latch should take place before the opening motion is applied to the door. The strength of the spring 49 may be such that the bolt 42 throughout the opening motion of the door will bear against the right hand end of the slot 38. However the strength of the spring 49 must be sufficient that at least when the door has reached its open position the spring shall be capable of pulling upon the rod 46 and the other members of the mechanism connecting to and through the levers 69 and the operating lever 74 so that it will pull back these connecting members and levers and restore the bolt 42 to the left-hand end of the slot 38. The purpose of this function of the spring 49 will be clear from the description to follow in connection with the operation of the device for release and setting of the latch.

When the motion of the lever 74 from the dotted position to the dash position in Figure I is effected and the bolt 42 is moved to the right-hand end of the slot 38 as shown in Figures II and III, the block 44 is also carried to the right. Fastened in block 44 by screws 80 or other fastening means is one end of the wire 82 referred to above which is carried by the flexible casing 84. The wire 82 extends beyond the casing 84 a sufficient distance to be fastened in the block 44 and to provide motion of the block 44 away from and toward the end of the casing 84. The end of the casing 84 is passed through a hole drilled in the head 86 of a suitable bolt 88 and fixed therein by means of a set screw 89. The bolt 88 may be tightly fixed in the plate 36 to maintain alignment of the portion of the casing held thereby in order that the wire 82 may move in line with said slot. As stated above however the block 44 is not rigidly fastened to the clevis 40, the clevis 40 having angular motion around the bolt 42 to compensate for the angular motion of the plate 36. It will now be understood that motion of the plate 36 produces a motion of the end of the casing 84 and of the wire 82 carried thereby with respect to the chassis and the structure of the vehicle. The casing and the wire being flexible this motion produces no undue strain upon these parts. Moreover it will now be clear that the initial motion given to the lever 74 which effects the movement of the bolt 42 lengthwise of the slot 38 may act to pull the wire 82 through the casing 84 for a distance equal to the length of the slot. Upon the reverse motion of the bolt 42 and the block 44, the wire 82 may move through the casing in the reverse direction until the bolt 42 reaches the left-hand end of the slot 38.

Referring again to Figure I, it will be seen that the casing 84 which carries the wire 82 extends from the head 86 of the bolt 88 in a suitable curve under and up through the vehicle and passes through a hole 90 in the door jamb of the door opening. The flexible casing 84 and its wire 82 therein then pass across the angular space between the door jamb 4 and the door and through a hole 92 in the post 8 of the door. The casing 84 then passes in a suitable curve up behind plate 9 of the door structure and is fastened to the frame of the lock by a clamp 100 as indicated in Figures IV and V. The curve or sweep of the flexible casing is preferably such as to minimize the friction created in pulling the wire around the curve of the sweep but by suitable lubrication relatively short bends or curves may be utilized if necessary. It is of course desirable not to use any more length of casing than is necessary but sufficient length should be provided to take care of the motion of the plate 36 without causing undue bending or strain upon the parts. Moreover sufficient length must be provided to allow for the distance across the angular space between the hole 90 in the door jamb and the hole 92 in the post 8 of the door. As this distance may be several inches, preferably I provide a relatively loose fit of the casing 84 in the hole 90 or in the hole 92, or in both, in order that the casing 84 may slip through one or the other or both of these holes and compensate for the distance across the angular space. Any bend produced by the angular motion of the door or of plate 36 may be taken up by the flexibility of the casing and of the wire carried thereby.

The end of the wire 82 projects beyond that end of the casing 84 which is fastened to the lock for a sufficient distance to engage with the latch of the lock. The end of the cable 84 is so clamped to the lock frame that the wire 82 extends in a general direction of the motion of the latch which effects release and latching of the door. In the particular embodiment illustrating my invention I have attached to the end of the wire 82 a collar 102 by suitable fastening means 103. Prior to fastening said collar 102 on said wire 82 I slip over the end of said wire 82 a block 104 and fasten it by set screws 105 to a raised boss 106 upon the shank 108 of the latch 17. The wire passes through the hole 110 in said block 104 with a loose fit which will permit said block to slide on said wire when the latch is moved by the normal operation of the handle 13 in the door. However the block 104 being rigidly fastened to the latch 17 transmits to said latch the pull of the wire 82 received by said block when the collar 102 is drawn against it. The free length of the wire is such that the latch may be moved away from the collar 102 by the normal operation of the latch handle 13 and, on the other hand, the pull upon the wire 82 through the casing 84 will permit the collar 102 to bear against the block 104 and move the latch through the normal distance necessary to release the latch from the striking plate in the frame of the door opening of the vehicle.

In the particular embodiment of my invention illustrated, the spindle 12 to the upper end of which the handle 13 is attached has at its lower end a dog 15 extending through a slot 111 in the shank 108 of the latch 17 and bearing upon the right-hand face of the boss 106. Movement of the handle 13 to produce rotating motion of the spindle 12 causes the dog 15 to bear upon the face of the boss and to move the latch 17 in the lock frame 10. The dog 15 has only bearing contact with said boss so that the latch 17 may be moved away from the dog by the pull of the wire 82 causing the collar 102 to bear upon the block 104 as described above. Moreover the spring 112 normally bears upon the end of the shank 108 of the latch 17 to hold the latch in the position for engaging the striking plate. It will be clear from a study of Figures IV and V that pull upon the wire 82 transmits motion through the collar 102 to block 104 and to the shank 108 of the latch 17, said motion being opposed by the spring 112. It will also be apparent that upon release of the pull upon the wire 82, the spring 112 acts to restore the latch and the block 104 carried thereby to the latched position and thus causes the block 104 to bear against the collar 102 thus to draw the wire through the casing 84.

From the above description it will now be clear that when the bolt 42 is moved in the slot 38 of the plate 36 so as to pull the wire 82 through the casing 84 that the latch 17 will be pulled from its position of engagement with the striking plate. It will also be clear that this motion is produced against the action not only of the spring 112 as has just been mentioned but against the spring 49. The action of these springs thus tends to restore the wire 82 and the latch 17 to the initial latching position. It also will be understood that the latch may be moved by contact with the striking plate so as to slip thereover into engagement therewith in the usual manner, the block 104 being capable of movement on the wire 82 in a direction away from the collar 102. Thus there is no interference with the normal latching operation of the latch. Moreover as stated above, for the same reason, the operation of the latch by the handle 13 may be effected to open or close the door. Thus in my device I have in no way interfered with the normal operation of the latching while at the same time I have provided for its operation prior to the opening of the door by the door opening mechanism.

Whether the motion to be transmitted to the latch from the mechanism operated by the driver is transmitted by pull or by push or by torsional motion of the member or element carried by the flexible casing, as has been described above, it will now be apparent that the flexibility of the casing and of the element or member contained therein is a feature of my invention which permits opening and closing of the door without obstruction of the space intended for entrance to and exit from the vehicle and also it will be apparent that without regard to the type of motion transmitted by means of the casing and the element contained therein I have provided a means of carrying up to the lock the differential motion intended for operating the latch and that this means is entirely flexible and completely compensates for the door motion.

As mentioned above, the form and construction of the casing and of its wire or other member contained therein is such that the wire may be pulled or pushed or given a torsional motion in the casing regardless of the position of the door. It will be apparent from a study of Figure I in view of the above description that for example, the dotted portion of the casing 84 may assume different positions, that is, different curved sweeps, with different positions of the plate 36. The casing will provide the support for the proper movement of the wire or other internal member in these different positions of the casing. Moreover if the portion of the casing 84 which lies within the door assumes different S bends or other curvatures because of the slip of the casing 84 through the hole 92 this casing nevertheless supports and carries the wire 82 so that the slide or torsional motion thereof may be transmitted through the wire to the latch of the lock.

In order to make this phase of the invention clear, it may be assumed in a practical embodiment of the arrangement shown in Figure I that the motion of the bolt 88 which is fastened in the plate 36 may be in an arc having a length of about six (6) inches requiring a motion of the cross head member of about the same amount. If the casing 84 were, throughout the length of the dotted portion thereof in Figure I, fastened to the structure of the vehicle and therefore the sweep or curve of the casing could not change to compensate for the motion of the plate 36, it will be apparent that force applied to the mechanism by the driver in moving the handle 74 to produce six (6) inches of motion of the bolt 88 must break some of the parts or else the motion of the plate 36 and the opening of the door would be prevented. Moreover, it will be apparent that if the wire 82 were carried through points of bearing fastened to the vehicle so as to slide through said bearings that a motion of six (6) inches, such as referred to above, would be too great for application to the latch to cause the opening thereof. I have therefore by my invention not only provided for a differential motion to effect the opening of the latch but I have also provided a flexible means which is capable of compensating for the requisite motion of the door over the relatively small differential motion required to release the latch and I have insured in the operation of the device this differential motion without regard to the degree to which the door is opened.

In the practical operation of the device, I have found that the initial motion of the lever 74 from the dotted position to the dash position effects a pull of the wire 82 through the casing 84 with motion of the bolt 42 in the slot 38, thus releasing the latch 17 when the door is in the closed position. By further movement of the lever 74 as described above opening motion of the door is started. By a suitable adjustment and fit of the parts of the mechanism and a proper selection of the strength of the spring 49, cooperating with the spring of the lock, the bolt 42 may return in slot 38 toward the left and the wire 82 be moved back through the casing 84 and the latch 17 be restored to the latching position. Thus there is produced no drag on the latch which might prevent its being ready to latch immediately upon closure of the door either by the operating mechanism or when the door is closed by hand from inside or from outside of the vehicle.

Moreover I preferably design the parts of the mechanism for operating the door so that, upon moving the door by hand to open or close it in the usual manner, motion may be given to the door operating mechanism without requiring great effort. Thus, for example, preferably the cross head member 56 and the levers and connecting rods are so designed as to limit the friction in order that the spring 49 will be effective to pull these parts into a position corresponding to the closed position of the door when the door is moved by hand from the position shown in Figure I to the closed position thereof. Thus the motion of the plate 36 will preferably not tend to produce the differential motion between the bolt 42 and the slot 38 when such a hand closing of the door is effected.

The arrangements of the parts shown in the figures are typical. Other mechanical devices may be utilized for the operation of the door or the opening or closing of the door may be effected by electric or pneumatic means. In general, according to my invention, I provide in connection with such means a differential motion which I utilize to move the wire through the flexible casing. However, as mentioned above, I may arrange the flexible casing and the member carried thereby for operation independently of the door opening mechanism. I thus utilize that phase of my invention according to which I provide for maintaining the alignment of the wire so as to permit its motion with respect to the door and to the frame of the vehicle to effect the releasing motion of the latch and also to effect the restoration of the latch to its latching position. Whether I utilize the separate operation of the latch or connect the flexible casing and its wire to the door operating mechanism, I obtain the advantage of avoiding interference with the space intended to be available for exit from and entrance into the vehicle as well as the quick and certain operation of the latch while holding the door under control. Moreover, I obtain these advantages without interfering with the normal operation of the opening and closing of the door, while providing mechanism for its operation from a remote point in the vehicle.

While in the above description and in the drawings the invention has been disclosed in connection with a door which is supported on hinges and swings through the angular space between its opened and closed positions, the invention is not limited to doors so arranged. For example, it may be applied to a sliding door in which the door slides past the member forming the side of the door opening. It will be clear that a flexible wire and its supporting casing, or the equivalent members embodying this feature of my invention, may be so supported with respect to the fixed structure of the door opening that said wire and casing may, by their flexibility, take up and compensate for the sliding motion of the door and that they may do this while being so arranged that the wire may be pulled or pushed or otherwise moved in the casing in order to effect the requisite motion of the latch. Similarly the invention may be applied to folding doors in which sections are hinged to each other and one section is hinged to the side or jamb of the door opening. Various other embodiments of my invention will be clear to those skilled in the art from the above description and from the drawings.

The invention may find application not only in vehicles as above described but also to doors in buildings, elevators and many other types of structures.

Having now described my invention, what I claim is:

1. In a door operating mechanism, means movable by hand at a point remote from the door, means supported outside the space of the door opening but adjacent the door and connected thereto to transmit motion to the door upon motion of said means adjacent the door, means providing a continuous force transmitting connection between said hand operable means and said means adjacent the door, said connection means being so arranged with respect to said means adjacent the door as to provide a slip motion of one with respect to the other, whereby when said door is held against motion upon an initial motion of said hand operable means motion of said connection means relative to said means adjacent the door is produced but thereafter upon further motion of said hand operable means said connection means may cause motion of the door, a latch upon the door, a flexible casing extending from a point adjacent the latch to a point adjacent said means adjacent the door, said flexible casing being so supported upon the door and with respect to the frame of the door as to provide for flexure of the casing in the opening and closing of the door, said casing also being so supported and arranged with respect to said connection means as to provide for flexure of the casing upon motion of said means adjacent the door in the opening and closing of the door, a flexible member connecting to the latch from said connection means and arranged to receive said initial motion of said hand operable means, said flexible member passing through said flexible casing and being supported thereby, said flexible casing being so formed and arranged as to provide for motion therein of said flexible member to cause transmission to the latch of said slip motion regardless of the flexed positions of said casing, and means biasing said connection means and said means adjacent the door against said slip motion and acting to restore said latch to latching position in the door after unlatching of the door while maintaining said continuous force-transmitting connection.

2. A mechanism according to claim 1 in which the casing passes through the post of the door and through the jamb of the door and is so arranged as to be slidable in at least one of said parts while maintaining said flexure of the casing.

3. In an operating mechanism for a door mounted on hinges, latching means upon the door, a member rotatable on an axis fixed relative to the door frame and extending in a direction generally like-extending with the axis of the hinges of the door, said member being arranged for engagement with said door to cause opening and closing movements thereof as determined by the direction of rotation of said member, means connecting said member to a hand operable means and constructed in relation to said member to provide a slip motion in relation thereto at a point outside the space of the door opening, said connecting means including means to bias said connecting means in a predetermined relation to said member rotatable on said axis, the arrangement and construction of the parts being such that when the door is in the closed position and is latched movement of the connecting means in relation to the means rotatable upon an axis may be effected against the bias of said bias means by movement of said hand operable means, means extending upon the door and connected to said connecting means and to the latch upon the door to transmit to the latch motion concomitantly with said slip motion, said bias means being so constructed and arranged in relation to said connecting means and to said member rotatable upon an axis as to restore the initial relation thereof upon release of the door from the latched position whereby the door in its open position has the latch thereof restored to the latching position, said means connecting to the latch being capable of flexure in the opening and closing movements of the door and being so mounted with respect to the door and its frame as to leave clear the door opening and the angular space between the door and said frame.

4. In a door operating mechanism, a member connected to move with the door, a part connected to said member with a slip motion at a point separated from the door, bias means acting parallel to said slip motion and connecting said part and said member to bias said part to a given relation to said member, a latch upon the door, a continuous wire connection extending upon the door from said part to said latch and arranged to effect unlatching movement of the latch when said part is moved with said slip motion against the bias of said bias means, said latch being arranged for unlatching movement thereof with a slip motion relative to said connection thereto effective when said part and said member are restored to said given relation by said bias means.

5. In a door operating mechanism for operating a door hung upon hinges, a vertical shaft, an arm fastened to such shaft to rotate therewith, the outer end of said arm engaging said door to effect opening and closing movement of the door upon rotation of said shaft, a member fastened upon said shaft to rotate therewith and provided with a slot with its length positioned circumferentially of said member with respect to said shaft, a clevis, a bolt passing through and fastened in said clevis and also passing through said slot so as to move therein lengthwise of the slot, a spring fastened to said member and to said clevis and acting in the direction generally parallel to the slot to bias said bolt and said clevis toward one end of the slot, a latch upon the door, and a Bowden wire connected between said clevis and the latch upon the door to effect unlatching motion of the latch upon movement of the clevis and the bolt along the slot against the bias of said spring, said Bowden wire being arranged to transmit reverse motion of said clevis and said bolt along said slot under the action of said spring to restore the latch to latching position, the strength of said spring being such that when the door is latched the spring may be stressed by moving the clevis and the bolt along the slot against the bias of said spring, said spring being of sufficient strength upon release to restore the initial relation of the parts and thereafter to transmit directly to the member from the clevis the force for opening the door.

6. In a door operating mechanism, a movable part, a movable member connected to the door in continuous force transmitting connection, said movable part and said movable member being so arranged and so connected to each other as to provide at a point outside the space of the door opening motion of said movable part relative to said movable member, means connecting said movable part with said movable member continuously acting to bias said movable part against motion relative to said member in a given direction and to restore said movable part to its initial position relative to said member when said part has been moved therefrom against the action of said bias means, latching means upon the door, and a flexible member extending upon the door and connecting from said point outside the space of the door opening to provide a continuous operative connection from said movable part to said latching means and constructed and arranged to move concomitantly with said movable part to effect respectively unlatching and latching movement of the latch upon said motions of the movable part relative to said member, said flexible member being so arranged and supported with respect to the door and the frame of the door as to flex in the opening and closing of the door while maintaining said operative connection between said part and said latch.

7. In a door operating mechanism, a movable part, a movable member connected to the door in continuous force transmitting connection, said movable part and said movable member being so arranged and so connected to each other as to provide at a point outside the space of the door opening motion of said movable part relative to said movable member, means connecting said movable part with said movable member continuously acting to bias said movable part against motion relative to said member in a given direction and to restore said movable part to its initial position relative to said member when said part has been moved therefrom against the action of said bias means, latching means upon the door, a flexible member extending upon the door and connecting from said point outside the space of the door opening to provide a continuous operative connection from said movable part to said latching means and constructed and arranged to move concomitantly with said movable part to effect respectively unlatching and latching movement of the latch upon said motions of the movable part relative to said member, said flexible member being so arranged and supported with respect to the door and the frame of the door as to flex in the opening and closing of the door while maintaining said operative connection between said part and said latch, said flexible member being so connected to the latch as to provide motion of the latch relative to the end of said flexible member connected to the latch, and means fastened to said flexible member for engaging the latch when said flexible member receives latch moving motion in the direction to unlatch the latch and arranged with respect to the latch so that said latch may be given unlatching motion independently of the latch moving motion of said flexible member.

8. In a door operating mechanism, a movable part, a movable member connected to the door in continuous force transmitting connection, said movable part and said movable member being so arranged and so connected to each other as to provide at a point outside the space of the door opening motion of said movable part relative to said movable member, means connecting said movable part with said movable member continuously acting to bias said movable part against motion relative to said member in a given direction and to restore said movable part to its initial position relative to said member when said part has been moved therefrom against the action of said bias means, latching means upon the door, and means extending upon the door from said point outside the space of the door opening and providing a continuous operative connection from said movable part to said latching means and constructed and arranged to move concomitantly with said movable part to effect respectively unlatching and latching movements of the latch upon said motions of the movable part relative to said member, said means extending upon the door being so constructed and arranged in relation to the door and to said member and the parts of the mechanism moving with the door that motion of said member and parts and of said door does not interfere with unlatching and latching movement of said means.

9. In a door operating mechanism, a movable member connected to the door in continuous force transmitting connection, said member having a slot therein at a point outside the space of the door opening, means slidable in said slot and constructed to bear upon the member adjacent an end of the slot to transmit motion to said member, means connected to said slidable means for transmitting thereto motion initiated at a point remote from the door to cause motion of said slidable means along said slot, a latch upon the door for restraining said door and said movable member connected thereto against motion, a connection extending upon the door from said slidable means to said latch to effect unlatching movement of said latch upon motion of said slidable means along said slot in the direction away from said end of the slot and latching movement of said latch upon reverse motion of said slidable means along said slot, and means effective upon completion of the unlatching movement of the latch releasing the door to restore said slidable means to its initial position at said end of the slot and to restore said latch to its latching position, said means extending from the door from said slidable means being capable of flexure to accommodate different positions of the door without interfering with the operation of said means which is effective to restore the latch to its latching position.

ELLERY W. THOMPSON.